3,037,884
METHOD AND COMPOSITION FOR PRESERVING TEXTILES

Rudolf Junghaehnel, Witten (Ruhr), Germany, assignor to Chemische Werke Witten, Witten (Ruhr), Germany
No Drawing. Filed Mar. 21, 1960, Ser. No. 16,163
Claims priority, application Germany Mar. 21, 1959
13 Claims. (Cl. 117—138.5)

The present invention relates to the utilization of a mixture of pentachlorophenol and pentachlorophenol fatty acid esters for preserving textiles.

It is already known in the art of preserving textiles to use pentachlorophenol fatty acid ester, particularly pentachlorophenol laurate, alone for the purpose of preserving textiles. It is also known to use pentachlorophenol alone for the same purpose.

However, both pentachlorophenol fatty acid ester and pentachlorophenol alone have great disadvantages. The disadvantage of applying pentachlorophenol alone is that pentachlorophenol has a relatively great volatility so that, accordingly, the preserving effect of pentachlorophenol has but a limited duration. Moreover, when pentachlorophenol is not applied in an expert manner, it has a tendency to effloresce.

In contrast thereto, pentachlorophenol esters are not voltatile, but the pentachlorophenol ester is of much lower efficacy in preserving textiles than pentachlorophenol, so that higher amounts thereof are required for the preservation of textiles. Also, pentachlorophenol esters, and particularly pentachlorophenol laurate, have a fatty, wax-like characteristic so that they have to be melted and diluted with diluents or solvents before being in a form applicable for use in preserving textiles.

It has been now found that by mixing pentachlorophenol with pentachlorophenol fatty acid esters, oily products are obtained which will not solidify even at room temperature, and which may be used for the purposes of preserving textiles without the admixture of solvents, such as solvents in the form of aqueous emulsions.

In contrast to the use of pentachlorophenol esters alone, the mixture according to the present invention has the advantage that considerably lower concentrations than those of pure esters suffice for a complete and lasting preservation.

In contrast to the use of pentachlorophenol alone, the mixture according to the present invention has the advantage that, despite such low amounts of the mixture, a good initial and lasting effect is achieved. It is particularly surprising that free pentachlorophenol neither evaporates in the presence of the ester, nor crystallizes.

Accordingly, it is an object of the present invention to provide an improved composition for use in preserving textiles from rotting and molding.

Another object of the present invention is to provide a new composition for preserving textiles which has a good initial and lasting preservation effect.

Another object of the present invention is to provide an improved composition for use in preserving textiles which need be used only in small concentrations to provide a complete and lasting preservation effect.

The present invention is based on the recognition that by mixing pentachlorophenol with pentachlorophenol fatty acid esters, preferably a fatty acid mixture having a chain length of 6–12 carbon atoms, in a ratio of at least 70% by weight chlorophenol fatty acid ester and up to 30% by weight pentachlorophenol, preferably 15 to 25%, improved compositions for preserving textiles are obtained. The products obtained will not solidify at room temperature and may be used for the purposes of preserving textiles to provide a preserving composition which has a good initial and lasting preservation effect.

Example I

A mixture of 20 parts by weight pentachlorophenol and 80 parts by weight pentachlorophenol ester of a fatty acid mixture having a chain length of 6 to 12 carbon atoms was made. The mixture resulted in an oily solution. The oily solution was emulsified in water using a fat alcohol sulfate, known commercially as "Lanette N," as the emulsifier. The emulsion thus made contained an effective mixture of the oily solution in a ratio of 3:100. Cotton fabric was impregnated with the emulsion so that the fabric after drying contained 2.5% of the effective substance, referred to the weight of the fibers. The rotting and mold tests, according to DIN Nos. 53931 and 53933, showed that the impregnated fabric was excellently mold- and rot-resistant. The 2.5% concentration applied to the heavy fabric showed, during a natural weathering test conducted for a period of over 18 months, the same initial and lasting effect as a 3.5% pure ester impregnation. The fabric impregnated with the mixture of the present invention showed, at the rotting test after 18 months, only a very minor loss of tensile strength (resistance to breaking), whereas the fabrics impregnated with pentachlorophenol and pentachlorophenol sodium, and subsequently fixed, had already suffered a substantial loss of tensile strength.

Other examples of mixtures of pentachlorophenol and pentachlorophenol esters of fatty acids which exhibit improved rotting and mold resistance over the pentachlorophenol and pentachlorophenol esters alone, which improved resistance may be shown by the above-mentioned tests according to DIN Nos. 53931 and 53933, are as follows:

Example II

A mixture of 15 parts by weight pentachlorophenol and 85 parts by weight pentachlorophenol ester of a fatty acid mixture having a chain length of 6 to 12 carbon atoms is prepared, the mixture resulting in an oily solution as in Example I. The oily solution is emulsified in water using a fat alcohol sulfate as the emulsifier. The emulsion thus made contains an effective mixture of the oily solution in a ratio of 3:100. Cotton fabric impregnated with the emulsion exhibits good resistance to mold and rot.

Example III

A mixture of 25 parts by weight of pentachlorophenol and 75 parts by weight of pentachlorophenol ester of a fatty acid mixture having a chain length of 6 to 12 carbon atoms is made and emulsified according to the method illustrated in Example I, so that the emulsion contains the effective mixture in the ratio 3:100. The fabric impregnated with this emulsified mixture is excellently mold- and rot-resistant.

Example IV

A mixture of 30 parts by weight pentachlorophenol and 70 parts by weight pentachlorophenol ester of a fatty acid mixture having a chain length of 6 to 12 carbon atoms is made and emulsified, according to the method of Example I. Cotton fabric impregnated with the emulsion exhibits excellent mold and rot resistance.

Example V

A mixture of 20 parts by weight pentachlorophenol and 20 parts by weight pentachlorophenol ester of myristic acid is prepared and emulsified according to the method as illustrated in Example I. Cotton fabric impregnated with the emulsion, as in Example I, exhibits excellent mold and rot resistance.

Example VI

A mixture of 20 parts by weight pentachlorophenol and 80 parts by weight pentachlorophenol ester of lauric acid is prepared and emulsified according to the method as illustrated in Example I. Cotton fabric impregnated with this emulsion, as in the above examples, exhibits excellent mold and rot resistance.

It will be apparent that many changes and modifications of the several features of the present invention described herein may be made without departing from the spirit and scope of the invention. It is, therefore, to be understood that the foregoing description is by way of illustration of the invention rather than limitation on the invention.

I claim:

1. A composition for use in preserving textiles comprising, at least 70% by weight of a pentachlorophenol fatty acid ester, and pentachlorophenol in oily form.

2. A composition for use in preserving textiles comprising, at least 70% by weight of a pentachlorophenol fatty acid ester, and 15–25% by weight of pentachlorophenol in oily form.

3. A composition for use in preserving textiles comprising, at least 70% by weight of the pentachlorophenol fatty acid esters of a fatty acid mixture, wherein the fatty acids have a chain length of from 6 to 12 carbon atoms, and 15–25% by weight of pentachlorophenol in oily form.

4. A method of preserving textiles which comprises, impregnating the textiles with an aqueous emulsion of a composition containing at least 70% by weight of a pentachlorophenol fatty acid ester, and pentachlorophenol in oily form, and then drying said textiles to fix the composition retained therein.

5. A method of preserving textiles which comprises impregnating the textiles with an aqueous emulsion of a composition containing at least 70% by weight of a pentachlorophenol fatty acid ester, and 15–25% by weight of pentachlorophenol in oily form, and then drying said textiles to fix the composition contained therein.

6. A method of preserving textiles which comprises, impregnating the textiles with an aqueous emulsion of a composition containing at least 70% by weight of the pentachlorophenol fatty acid esters of a fatty acid mixture wherein the fatty acids have a chain length of from 6 to 12 carbon atoms, and 15–25% by weight of pentachlorophenol in oily form, and then drying said textiles to fix the composition therein.

7. A method of preserving textiles which comprises, impregnating the textiles with an aqueous emulsion containing about 3% by weight of a mixture comprising at least 70% by weight of a pentachlorophenol fatty acid ester, and 15–25% by weight of pentachlorophenol in oily form, and then drying said textiles to fix the composition therein.

8. A method of preserving textiles which comprises, impregnating the textiles with an aqueous emulsion containing about 3% by weight of a mixture comprising at least 70% by weight of the pentachlorophenol fatty acid esters of a fatty acid mixture wherein the fatty acids have a chain length of from 6 to 12 carbon atoms, and 15 to 25% by weight of pentachlorophenol in oily form, and an emulsifier, and then drying said textiles to fix the composition therein.

9. A method of preserving textiles which comprises, impregnating the textiles with predetermined amounts of an aqueous emulsion of a composition containing at least 70% by weight of a pentachlorophenol fatty acid ester, and 15–25% by weight of pentachlorophenol in oily form, and then drying said textiles to fix the composition therein, said predetermined amounts being such that the textiles absorb about 2.5% of said composition, referred to the weight of the textiles after drying.

10. A method of preserving textiles which comprises, impregnating the textiles with predetermined amounts of an aqueous emulsion containing about 3% by weight of a composition comprising at least 70% by weight of a pentachlorophenol fatty acid ester and 15–25% by weight of pentachlorophenol in oily form, and an emulsifier, and then drying said textiles to fix the composition therein, said predetermined amounts being such that the textiles absorb about 2.5% of said composition, referred to the weight of the textiles after drying.

11. A composition for use in preserving textiles which composition does not solidify at room temperatures, comprising the oily mixture containing at least 70% by weight of a pentachlorophenol fatty acid ester and substantial amounts up to 30% by weight of pentachlorophenol in oily form.

12. A method of preserving textiles which comprises, impregnating the textiles with an aqueous emulsion of the oily composition containing at least 70% by weight of a pentachlorophenol fatty acid ester, and substantial amounts up to 30% by weight of pentachlorophenol in oily form, and then drying said textiles to fix the composition contained therein.

13. A method of preserving textiles which comprises, impregnating the textiles with predetermined amounts of an aqueous emulsion of the oily composition containing at least 70% by weight of a pentachlorophenol fatty acid ester, and substantial amounts up to 30% by weight of pentachlorophenol in oily form, and then drying said textiles to fix the composition therein, said predetermined amounts being such that the textiles absorb about 2.5% of said composition, referred to the weight of the textiles after drying.

References Cited in the file of this patent

UNITED STATES PATENTS

| | | |
|---|---|---|
| 2,182,081 | Hatfield | Dec. 5, 1939 |
| 2,430,017 | Houk | Nov. 4, 1947 |
| 2,789,060 | Spangenberg et al. | Apr. 16, 1957 |